United States Patent [19]

Knödler

[11] 4,419,419

[45] Dec. 6, 1983

[54] RECHARGEABLE ELECTRIC STORAGE BATTERY

[75] Inventor: Reinhold Knödler, Heidelberg, Fed. Rep. of Germany

[73] Assignee: Brown, Boveri & Cie AG, Mannheim, Fed. Rep. of Germany

[21] Appl. No.: 371,120

[22] Filed: Apr. 23, 1982

[30] Foreign Application Priority Data

May 8, 1981 [DE] Fed. Rep. of Germany ....... 3118194

[51] Int. Cl.³ .................. H01M 4/36; H01M 2/02; H01M 4/48; H01M 6/18
[52] U.S. Cl. .................... 429/104; 429/164; 429/165; 429/193
[58] Field of Search ............... 429/104, 193, 164, 165, 429/174

[56] References Cited

U.S. PATENT DOCUMENTS

| | | | |
|---|---|---|---|
| 3,475,220 | 10/1969 | Knorr | 429/104 |
| 4,170,694 | 10/1979 | Chase et al. | 429/104 |
| 4,279,974 | 7/1981 | Nishio | 429/104 |

Primary Examiner—Brian E. Hearn
Assistant Examiner—Stephen J. Kalafut
Attorney, Agent, or Firm—Herbert L. Lerner; Laurence A. Greenberg

[57] ABSTRACT

Battery containing several individual Na/S cells which are connected to each other by thermo-compression seals, in which the positive/negative electrochemical material is arranged alternatingly between the housing and the electrolytes of the cells, the electrolytes of the cells being separated from each other by electrically conducting/non-conducting plates.

6 Claims, 2 Drawing Figures

RECHARGEABLE ELECTRIC STORAGE BATTERY

BACKGROUND OF THE INVENTION

1. Field of the Invention

The invention relates to a rechargeable electric storage battery with liquid sodium as the negative and liquid sulfur, absorbed in graphite, as the positive electrochemical, as well as sodium ion-conducting solid electrolytes, which have metallic housings.

2. Description of the Prior Art

The principle of electric sodium/sulfur batteries is known (B. Fischer, H. Meinhold, Elektrische Energietechnik 24, 1979, pages 1–6). Such batteries consist in substance of several individual cells which can be constructed with the sodium ion conductor ($\beta$-Al$_2$O$_3$) in the form of tubes closed at one end. In the reaction of sulfur (cathode) with sodium (anode) occurring in the cell, an electric current is generated. The sodium or the sulfur, respectively, can be disposed either in the interior or outside of the tube. The tube which consists of $\beta$-Al$_2$O$_3$ functions as an electrolyte and a separator between the negative and the positive active material. The sulfur is usually absorbed in a graphite matrix. Individual cells are built and are electrically wired to each other in series or parallel. Such individual design requires relatively large space, and a separate housing is required for each cell. As a positive result, the volumetric and gravimetric energy density becomes worse. A remedy was obtained in part by changing the cell concept and either several tubes were put in a common outer sodium reservoir (German Pat. No. 2,456,021) or the shape of the ceramic was changed into plates or concentric tubes (German Pat. No. 2,518,923). These cell arrangements, however, have the disadvantage that the current paths between the cells are relatively long, which can add up to represent considerable ohmic losses. In addition, either the shape of the ceramic or the type of electrical interconnection is expensive, which leads to a considerable cost increase in the production of the battery.

SUMMARY OF THE INVENTION

It is an object of the present invention to provide a rechargeable electric storage battery with an arrangement of Na/S cells which overcomes disadvantages of the known sodium/sulfur battery.

With the foregoing and other objects in view, there is provided in accordance with the invention a rechargeable electric storage battery composed of a plurality of individual cells, each cell having liquid sodium as the negative and liquid sulfur, absorbed in graphite, as the positive electrochemical material, as well as a sodium ion-conducting solid electrolyte and a metallic housing, which comprises (a) the individual cells are series-connected and the individual cells are connected to each other; each cell has the electrolyte arranged coaxially in the housing, to which the electrolyte at both its ends is connected;

(b) two adjacent series-connected individual cells have a dissimilar arrangement of the sodium and the sulfur materials with one of said two cells having the sulfur between the housing and the electrolyte and the sodium in the interior of the electrolyte, and said other cell having the sulfur and sodium materials in the reverse order; the electrolytes in said two cells separated from each other by a plate; and (c) an electrically insulating connection is made between the housings or the electrolytes of each two adjacent individual cells connected in series.

Other features which are considered as characteristic for the invention are set forth in the appended claims.

Although the invention is illustrated and described herein as embodied in a rechargeable electric storage battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

According to the invention, a rechargeable electric battery of the kind mentioned at the outset has the arrangement that (a) individual cells are connected in series and to each other and each cell has a housing and an electrolyte coaxially arranged in the housing to which the electrolyte at both its ends and is connected;

(b) two adjacent series-connected individual cells have a dissimilar arrangement of the sodium (Na) and the sulfur (S) which may be arranged between the housing and the electrolyte or in the electrolyte, and that their electrolytes are separated from each other by a plate;

(c) an electrically insulating connection is developed alternatingly either between the housings or the electrolytes of the series-connected individual cells.

The battery contains several individual cells which are connected to each other by thermo-compression seals, in which the positive/negative electrochemical material is arranged alternatingly between the housing and the electrolytes of the cells, the electrolytes of the cells being separated from each other by electrically conducting/non-conducting plates.

In one preferred embodiment of the battery according to the invention, the housing is shaped like a tube and the electrolyte is tubular. The electrically non-conducting connection between the individual cells is made by $\beta$-Al$_2$O$_3$ rings and the thermo-compression of the seals of the entire arrangement can be performed in a single operation. With the current-conducting wiring the ohmic losses are minimized and become negligibly small. If several individual cells are wired together, a substantial reduction of the overall volume is obtained as compared to the known arrangements.

Figure 1:
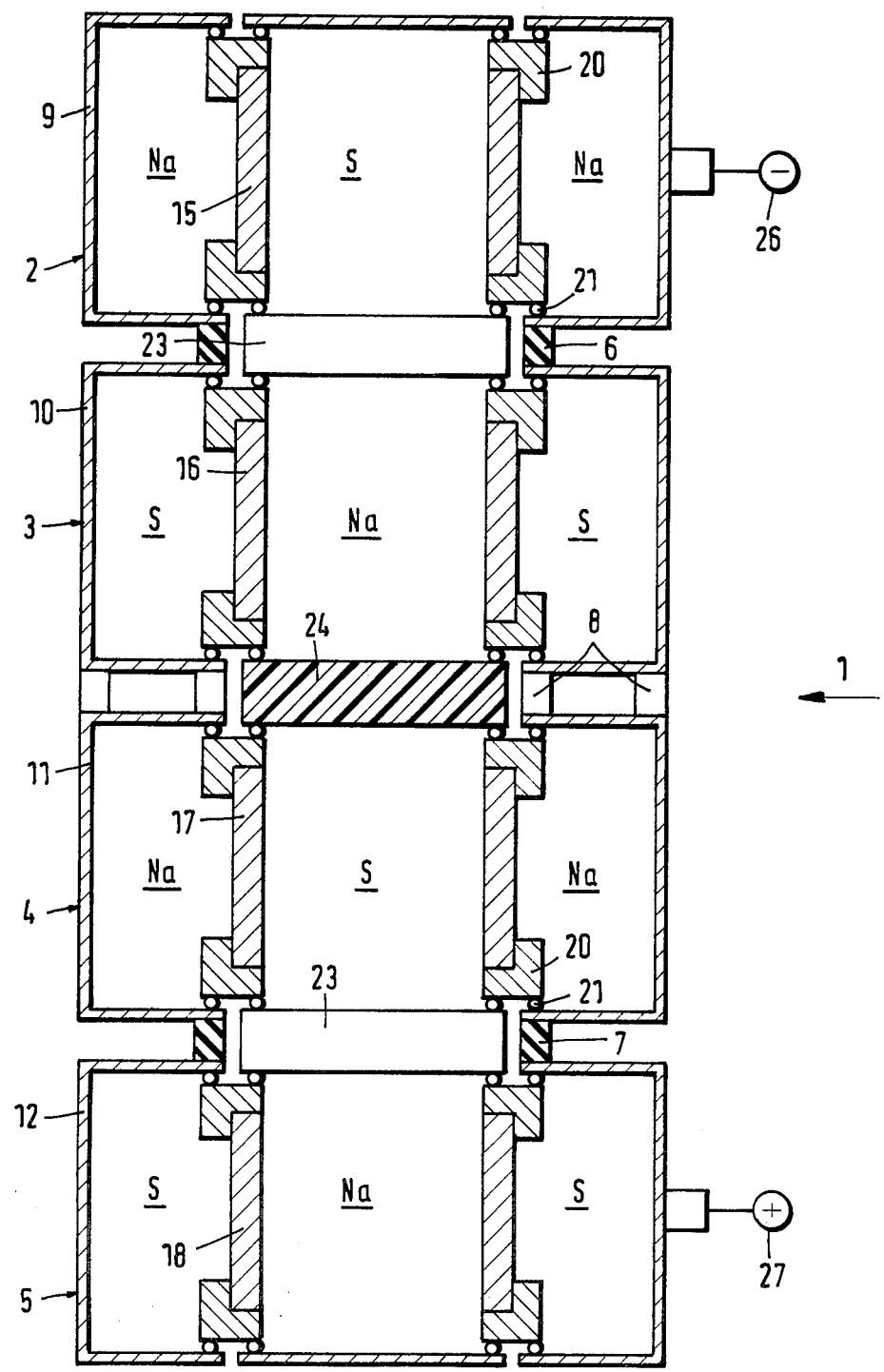
FIG. 1 diagrammatically illustrates a cross section through a battery according to the invention in which four individual cells are connected to each other by thermo-compression seals, and in which the positive/negative electrochemical material is arranged alternatingly between the housing of the battery and the electrolyte, with the electrolytes being separated from each other by electrically conducting/non-conducting plates.

Further advantages and features of the invention can be seen from the following presentation of further details as well as from the drawings showing two embodiments of the invention:

FIG. 1 shows an axial section through a battery, and

Figure 2:
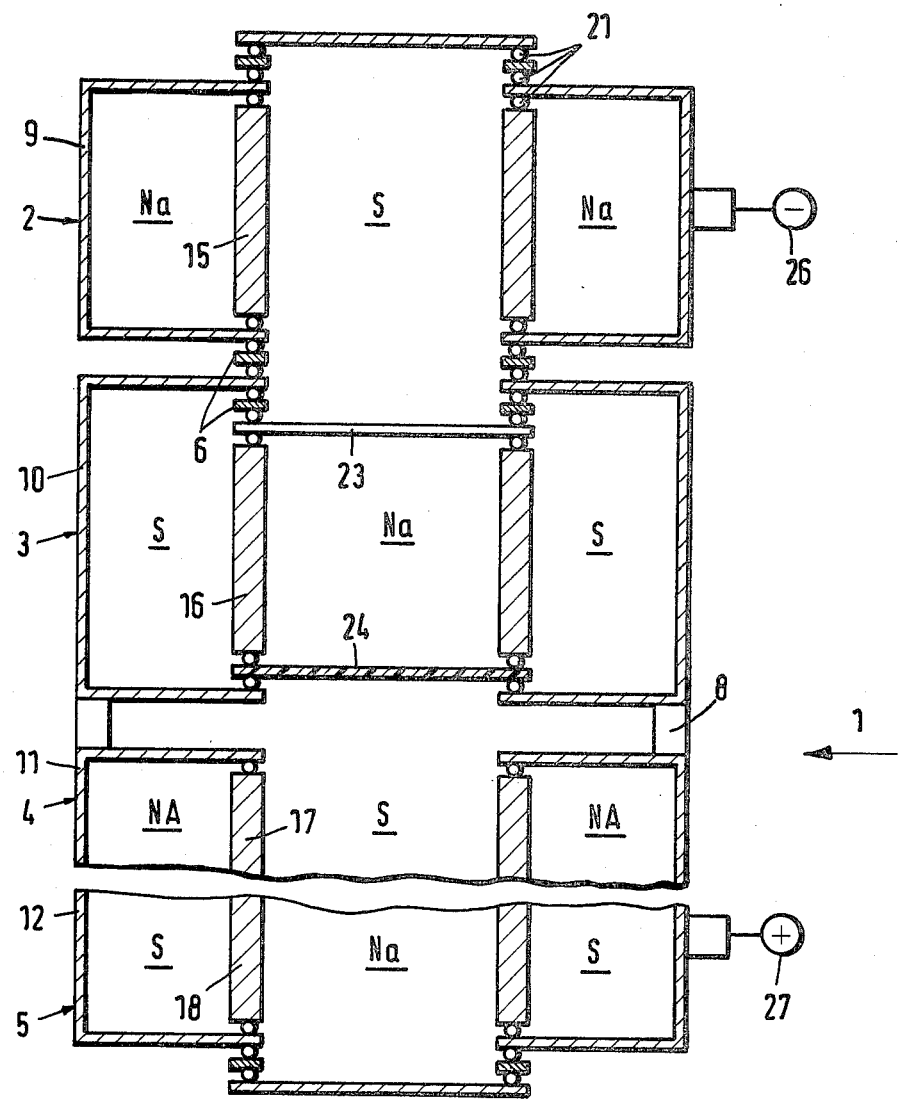
FIG. 2 is a variant of FIG. 1 in which the electrolytes do not have fused-on $\alpha$-Al$_2$O$_3$ rings but instead the electrolytes are directly connected to the housing or to the plates.

FIG. 2, a further embodiment of the battery according to the invention in an axial section.

In FIG. 1, a cross section through a battery according to the invention is shown schematically simplified. It is intended for operating temperatures of about 250° to 400° C. In the present embodiment example, the battery is composed of four individual cells which are electrically connected in series.

The battery 1 consists of four individual cells 2, 3, 4, 5 which are connected in series and are connected together by electrically insulating connections 6, 7 and an electrically conducting connection 8. The hermetic seal shown is made by $\alpha$-Al$_2$O$_3$ rings which are connected to the housings 9, 10; 11, 12 by thermo-compression. The connection 8 between the housings 10, 11 is established by an Al ring. The electrolytes 15, 16, 17, 18 are arranged in the housings 9, 10, 11, 12 coaxially and are connected to the housings 9, 10, 11, 12 via rings 20 which consist of $\alpha$-Al$_2$O$_3$ and via rings 21 which are made of Al. The electrolytes 15, 16, 17, 18 are separated from each other by electrically conducting plates 23 and an electrically non-conducting plate 24. The sodium (Na) and the sulfur (S) are arranged alternatingly either between the housing 9 and the electrolyte 15 or in the electrolyte 15. The electrolyte 15 is made of $\beta$-Al$_2$O$_3$ tubes. The current collectors 26, 27 are arranged to one side.

In the arrangement according to FIG. 2, the type of seal is different with the design otherwise the same (only two cells and the lower end are shown here, however). The electrolytes 15, 16 have no fused-on $\alpha$-Al$_2$O$_3$ rings and are connected directly to the housing 9 or to the plates 23, 24. For electrical insulation, rings 6 of $\alpha$-Al$_2$O$_3$ are arranged in said places. No electrical contact can exist between the sodium and the sulfur electrode, because in the presence of sulfur, highly insulating aluminum sulfide layers are produced immediately on aluminum. It is the advantage of this arrangement that no longer are fusing points provided (no danger of corrosion). In addition, such a cell assembly can be produced in a single operation.

I claim:
1. Rechargeable electric storage battery comprising
   (a) a plurality of individual cells, each cell having liquid sodium as the negative and liquid sulfur, absorbed in graphite, as the positive electrochemical material, as well as a sodium ion-conducting solid electrolyte and a metallic housing,
   (b) the individual cells being series-connected and the individual cells being connected to each other, each cell having a tubular electrolyte arranged coaxially in a tubular housing, to which the electrolyte at both its ends is connected;
   (c) two adjacent series-connected individual cells having a dissimilar arrangement of the sodium and the sulfur materials with one of said two cells having the sulfur between the housing and the electrolyte and the sodium in the interior of the electrolyte, and the other of said two cells having the sulfur and sodium materials in the reverse order;
   (d) the electrolytes of some of the two adjacent series-connected individual cells being separated from each other by an electrically conducting plate while the housing of said two cells are connected by an alpha-Al$_2$O$_3$ ring, and the electrolytes of other two adjacent series-connected individual cells being separated from each other by an electrically non-conducting plate while the housing of said two cells are connected by an Al ring, and these two forms of connections alternating in the series-connection of the cells.

2. Electric battery according to claim 1, wherein the individual cells are connected to each other by thermo-compression seals.

3. Electric battery according to claim 1, wherein the individual cells are connected to each other by thermo-compression seals, and wherein the electrically non-conducting connection between the housing of two individual cells has an alpha-Al$_2$O$_3$ ring.

4. Electric battery according to claim 1 or claim 2 or claim 3, wherein the electrically conducting and non-conducting plates are connected to the electrolytes via aluminum rings.

5. Electric battery according to claim 1 or claim 2 or claim 3, wherein the electrically conducting and non-conducting plates are connected to the electrolytes via aluminum rings, and also connected to the housing.

6. Electric battery according to claim 1 or claim 2 or claim 3, wherein the electrolytes have fused-on alpha-Al$_2$O$_3$ rings at their ends via which the electrolytes are connected to the plates and to the housings.

* * * * *